(12) United States Patent
Habibian et al.

(10) Patent No.: US 10,740,654 B2
(45) Date of Patent: Aug. 11, 2020

(54) FAILURE DETECTION FOR A NEURAL NETWORK OBJECT TRACKER

(71) Applicant: QUALCOMM Incorporated, San Diego, CA (US)

(72) Inventors: Amirhossein Habibian, Amsterdam (NL); Cornelis Gerardus Maria Snoek, Volendam (NL)

(73) Assignee: Qualcomm Incorporated, San Diego, CA (US)

( * ) Notice: Subject to any disclaimer, the term of this patent is extended or adjusted under 35 U.S.C. 154(b) by 142 days.

(21) Appl. No.: 15/877,226

(22) Filed: Jan. 22, 2018

(65) Prior Publication Data

US 2019/0228266 A1 Jul. 25, 2019

(51) Int. Cl.
*G06K 9/62* (2006.01)
*G06N 3/04* (2006.01)
*G06K 9/66* (2006.01)
*G06N 3/08* (2006.01)

(52) U.S. Cl.
CPC ............ *G06K 9/6262* (2013.01); *G06K 9/66* (2013.01); *G06N 3/0445* (2013.01); *G06N 3/0454* (2013.01); *G06N 3/08* (2013.01); *G06K 9/6267* (2013.01); *G06N 3/084* (2013.01)

(58) Field of Classification Search
CPC ...... G06K 9/6262; G06K 9/66; G06K 9/6267; G06N 3/0445; G06N 3/0454; G06N 3/084

See application file for complete search history.

(56) References Cited

U.S. PATENT DOCUMENTS

| | | | |
|---|---|---|---|
| 9,483,838 B2 | 11/2016 | Bulan et al. | |
| 9,582,895 B2 | 2/2017 | Brown et al. | |
| 9,760,806 B1 | 9/2017 | Ning et al. | |
| 10,037,624 B2* | 7/2018 | Cashman | G06T 17/20 |
| 2009/0290791 A1 | 11/2009 | Holub et al. | |
| 2014/0093176 A1 | 4/2014 | Maeda et al. | |
| 2017/0053167 A1 | 2/2017 | Ren et al. | |
| 2017/0337693 A1* | 11/2017 | Baruch | G06T 7/168 |
| 2018/0211396 A1* | 7/2018 | Roshtkhari Javan | G06T 7/248 |
| 2019/0122072 A1* | 4/2019 | Cricr | G06K 9/6215 |
| 2019/0171936 A1* | 6/2019 | Karras | G06N 3/08 |
| 2019/0188567 A1* | 6/2019 | Yao | G06N 3/04 |

OTHER PUBLICATIONS

Yun, Sangdoo "Action-Decision Networks for Visual Tracking with Deep Reinforcement Learning" IEEE Conference on Computer Vision and Pattern Recognition. (Year: 2017).*
International Search Report and Written Opinion—PCT/US2019/013372—ISA/EPO—dated Apr. 30, 2019.

(Continued)

*Primary Examiner* — Kim Y Vu
*Assistant Examiner* — Molly Delaney
(74) *Attorney, Agent, or Firm* — Seyfarth Shaw LLP

(57) ABSTRACT

A method of detecting failure of an object tracking network with a failure detection network includes receiving an activation from an intermediate layer of the object tracking network and classifying the activation as a failure or success. The method also includes determining whether to initiate a recovery mode of the object tracking network or to remain in a tracking mode of the object tracking network, based on the classifying.

30 Claims, 12 Drawing Sheets

(56) References Cited

OTHER PUBLICATIONS

Leang I., et al., "On-Line Fusion of Trackers for Single Object-Tracking", Pattern Recognition, vol. 74, Sep. 19, 2017 (Sep. 19, 2017), pp. 459-473, XP085273154, ISSN: 0031-3203, DOI: 10.1016/J.PATCOG.2017.09.026, abstract; Sections 5 and 6.
Li D., et al., "Object Tracking with Convolutional Neural Networks and Kernelized Correlation Filters", 2017 29th Chinese Control and Decision Conference (CCDC), IEEE, May 28, 2017 (May 28, 2017), pp. 1039-1044, XP033120741, DOI: 10.1109/CCDC.2017.7978672, [retrieved on Jul. 12, 2017], abstract; Sections 1-3.
Supancic J. III., et al., "Tracking as Online Decision-Making: Learning a Policy from Streaming Videos with Reinforcement Learning", 2017 IEEE International Conference on Computer Vision (ICCV), IEEE, Oct. 22, 2017 (Oct. 22, 2017), pp. 322-331, XP033282886, DOI:10.1109/ICCV.2017.43, [retrieved on Dec. 22, 2017], abstract; Sections 1, 3-5, and 6.2.
Walsh R., et al., "Detecting Tracking Failures from Correlation Response Maps", Advances in Visual Computing, 2016, XP055581832, Cham ISBN: 978-3-319-50835-1, pp. 125-135, Retrieved from the Internet: URL: https:// link.springer.com/content/pdf/10.1007/978-3-319-50835-1_12.pdf [retrieved on Apr. 17, 2019], abstract; Sections 1, 3-4.
Ying C., et al., "Depth-Adaptive Computational Policies for Efficient Visual Tracking", ARXIV.ORG, Cornell University Library, 201 Olin Library Cornell University Ithaca. NY 14853. Jan. 1, 2018 (Jan. 1, 2018), XP080849895, 14 Pages, Abstract; Sections 1, 3-4.

\* cited by examiner

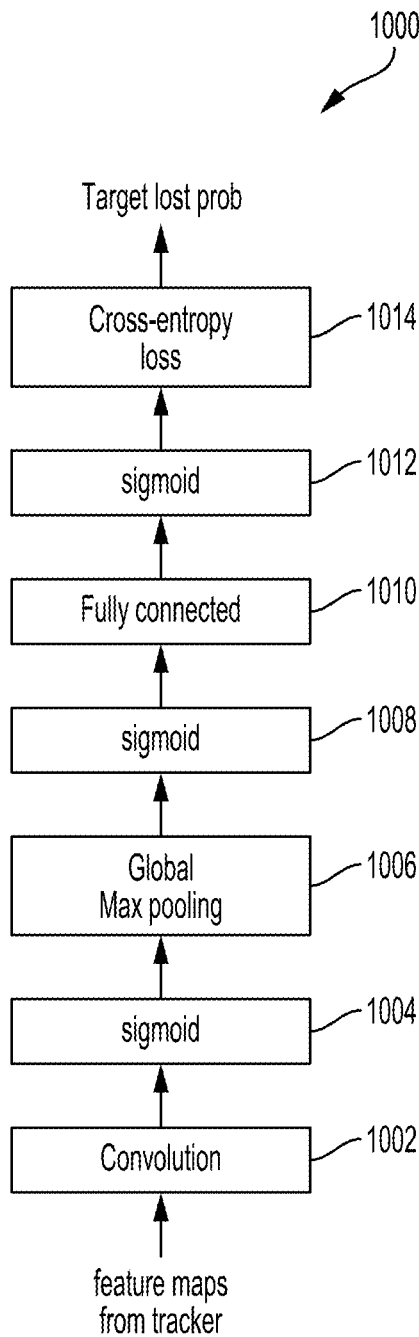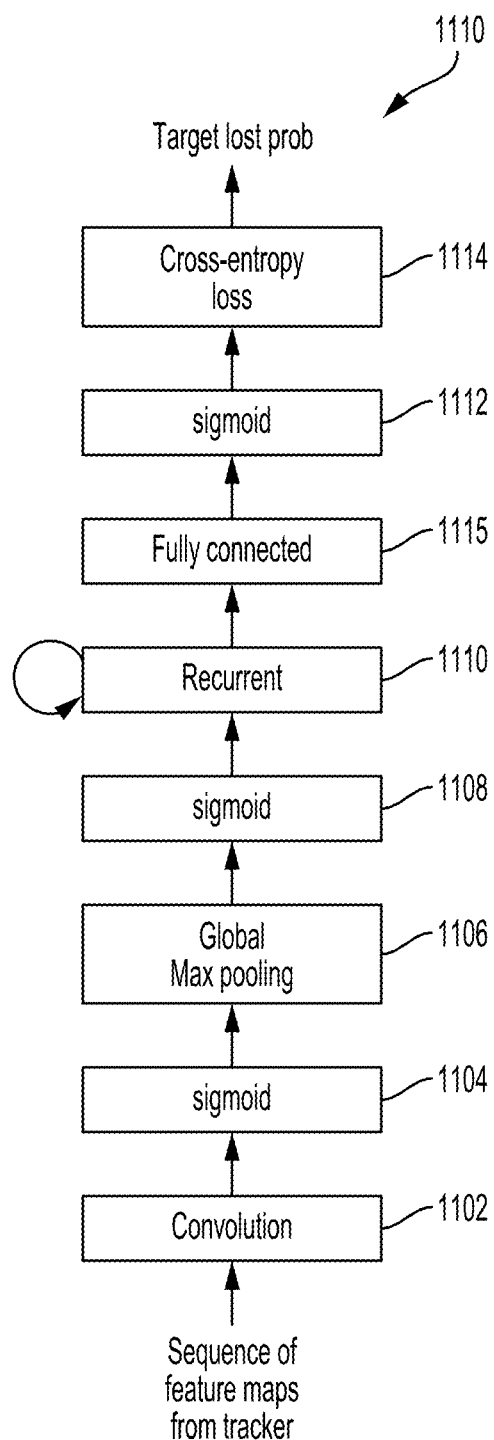
*FIG. 10*     *FIG. 11*

U S 10,740,654 B2

FAILURE DETECTION FOR A NEURAL NETWORK OBJECT TRACKER

BACKGROUND

Field

Certain aspects of the present disclosure generally relate to machine learning and, more particularly, to improving systems and methods for tracking objects with an artificial neural network.

Background

An artificial neural network, which may comprise an interconnected group of artificial neurons (e.g., neuron models), is a computational device or represents a method to be performed by a computational device.

The artificial neural network may be specified to perform computations on sequential data, such as a video. The computations may include extracting features and/or classifying objects in the sequential data. The extracted features and/or classification may be used for object tracking. The object tracking may be used for various applications and/or devices, such as internet protocol (IP) cameras, Internet of Things (IoT) devices, autonomous vehicles, and/or service robots. The applications may include improved or more computationally efficient object perception. Additionally, or alternatively, the applications may include understanding an object's path for route planning.

The goal of object tracking is to track one or more objects over consecutive frames from a sequence of frames (e.g., video). For example, given the location of a target (e.g., object) in a current frame (t), the object tracker predicts the location of the target at a subsequent frame (t+1). Over time, the object tracker may fail due to different conditions, such as unstable lighting, erratic movement of the target, clutter, and/or occlusions. The failure may be propagated through time, such that the target may be lost over a series of consecutive frames.

Conventional systems may detect a tracking failure from a trajectory difference. The trajectory difference identifies a failure if a location of the target substantially changes over consecutive frames. That is, a failure is detected if the distance (e.g., Euclidean) between object bounding boxes of two consecutive frames exceeds a threshold. Trajectory difference detection may detect false positives and may need fine tuning. That is, the threshold may be an ad hoc threshold. Also, the threshold may need to be tuned for each new tracker setting. Moreover, fast moving objects may cause false positives. Conventional systems using trajectory difference also have difficulty in detecting objects near the sensor (e.g., camera).

Conventional systems may also use appearance difference to detect a failure. Appearance difference identifies a failure if the appearance of the target substantially changes over consecutive frames. That is, a failure is detected if the distance (e.g., correlation or Euclidean) between the object patch within two consecutive frames exceeds a pre-determined threshold. Appearance difference detection may result in false positives and may need fine tuning. That is, the threshold may be an ad hoc threshold. Furthermore, false positives may be detected if the target appearance changes over time. For example, the target appearance may change due to changes in illumination and/or pose. Appearance difference detection may fail to identify a failure when a frame includes similar objects.

In conventional systems, various techniques may be used to recover a lost target. For example, the lost target may be recovered by re-initializing the object tracker, receiving user input to identify the target in a frame, and/or searching an entire frame for the lost target. It is desirable to improve object tracking systems to provide a method and system to reduce a time for detecting a tracking failure.

SUMMARY

In one aspect of the present disclosure, a method for detecting failure of an object tracking network with a failure detection network is disclosed. The method includes receiving an activation from an intermediate layer of the object tracking network. The method also includes classifying the activation as a failure or success. The method further includes determining whether to initiate a recovery mode of the object tracking network or to remain in a tracking mode of the object tracking network. The determination is based on the classification (e.g., failure or success).

Another aspect of the present disclosure is directed to an apparatus including means for receiving an activation from an intermediate layer of the object tracking network. The apparatus also includes means for classifying the activation as a failure or success. The apparatus further includes means for determining whether to initiate a recovery mode of the object tracking network or to remain in a tracking mode of the object tracking network. The determination is based on the classification (e.g., failure or success).

In another aspect of the present disclosure, a non-transitory computer-readable medium with non-transitory program code recorded thereon is disclosed. The program code is for detecting failure of an object tracking network with a failure detection network. The program code is executed by a processor and includes program code to receive an activation from an intermediate layer of the object tracking network. The program code also includes program code to classify the activation as a failure or success. The program code further includes program code to determine whether to initiate a recovery mode of the object tracking network or to remain in a tracking mode of the object tracking network. The determination is based on the classification (e.g., failure or success).

Another aspect of the present disclosure is directed to a failure detection network for detecting failure of an object tracking network. The failure detection network has a memory and one or more processors coupled to the memory. The processor(s) is configured to receive an activation from an intermediate layer of the object tracking network. The processor(s) is also configured to classify the activation as a failure or success. The processor(s) is further configured to determine whether to initiate a recovery mode of the object tracking network or to remain in a tracking mode of the object tracking network. The determination is based on the classification (e.g., failure or success).

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 10-11 illustrate examples of a failure detection network in accordance with aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Figure 1:
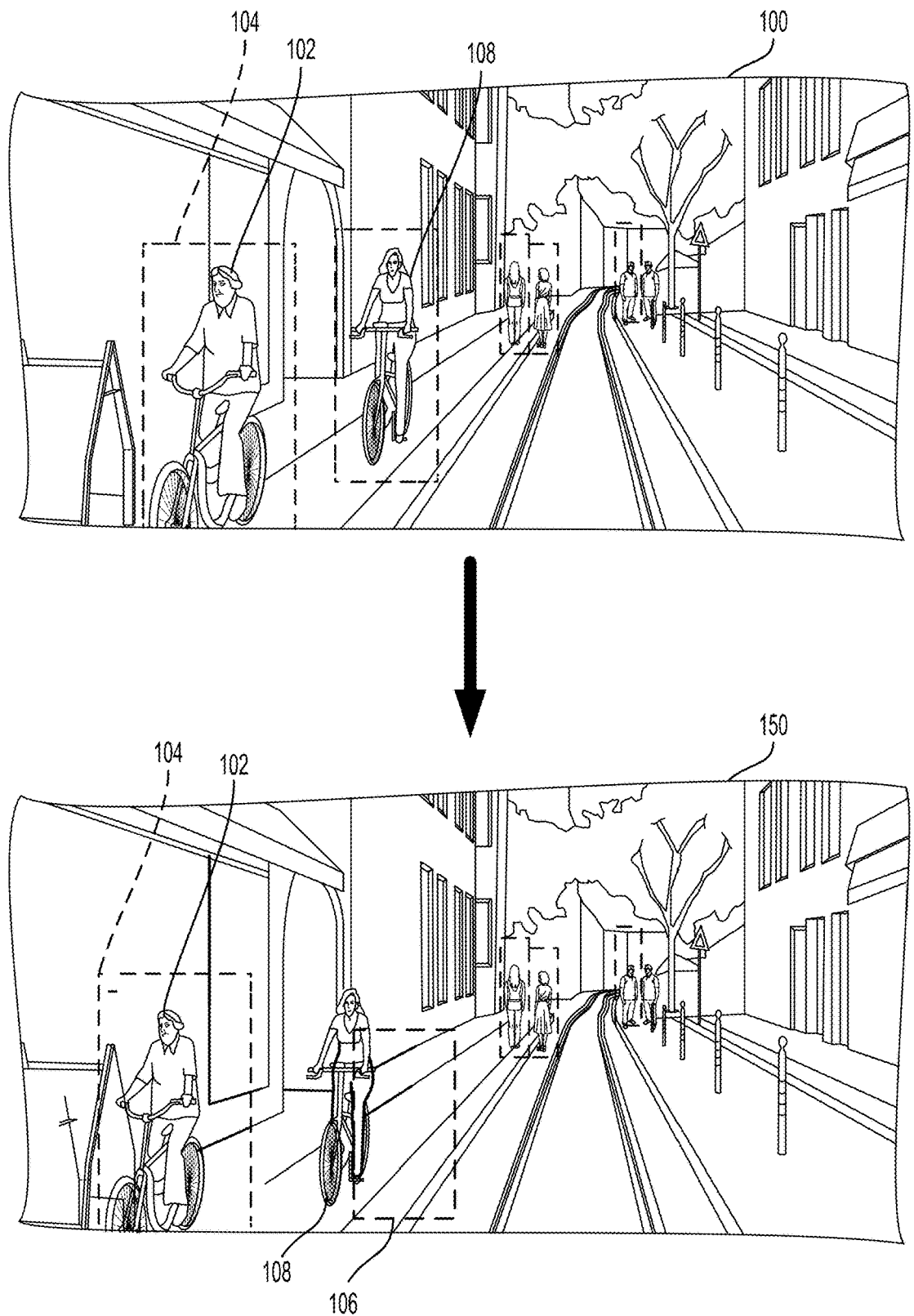
FIG. 1 illustrates an example of object tracking according to aspects of the present disclosure.

An artificial neural network may be specified to extract features and/or classify objects from sequential data, such as a video. The extracted features and/or classification may be used by the artificial neural network to track an object. FIG. 1 illustrates an example of object tracking from a first frame (t) 100 an Nth frame (t+n) 150. The first frame 100 and the Nth frame 150 include objects 102, such as a first object 108, to be tracked by an object tracking system. Each object 102 may be given a unique object identification (ID) so that the object may be tracked through subsequent frames. As shown in FIG. 1, each moving object 102 may be bounded by a bounding box 104. The artificial neural network may track each object 102 in a sequence of frames. That is, given an object's bounding box 104 in the first frame 100, the artificial neural network predicts a location of each object 102 over time (e.g., over consecutive frames).

Over time, the artificial neural network may lose track of one or more objects 102 (e.g., targets) due to a failure of the object tracker. As shown in FIG. 1, failure at a frame prior to the Nth frame 150 may cause the object tracker to lose track of an object, such as the first object 108, at the Nth frame 150. In this example, the failure of the object tracker causes a bounding box 106 of the first object 108 to be misaligned with the first object 108.

Figure 2:
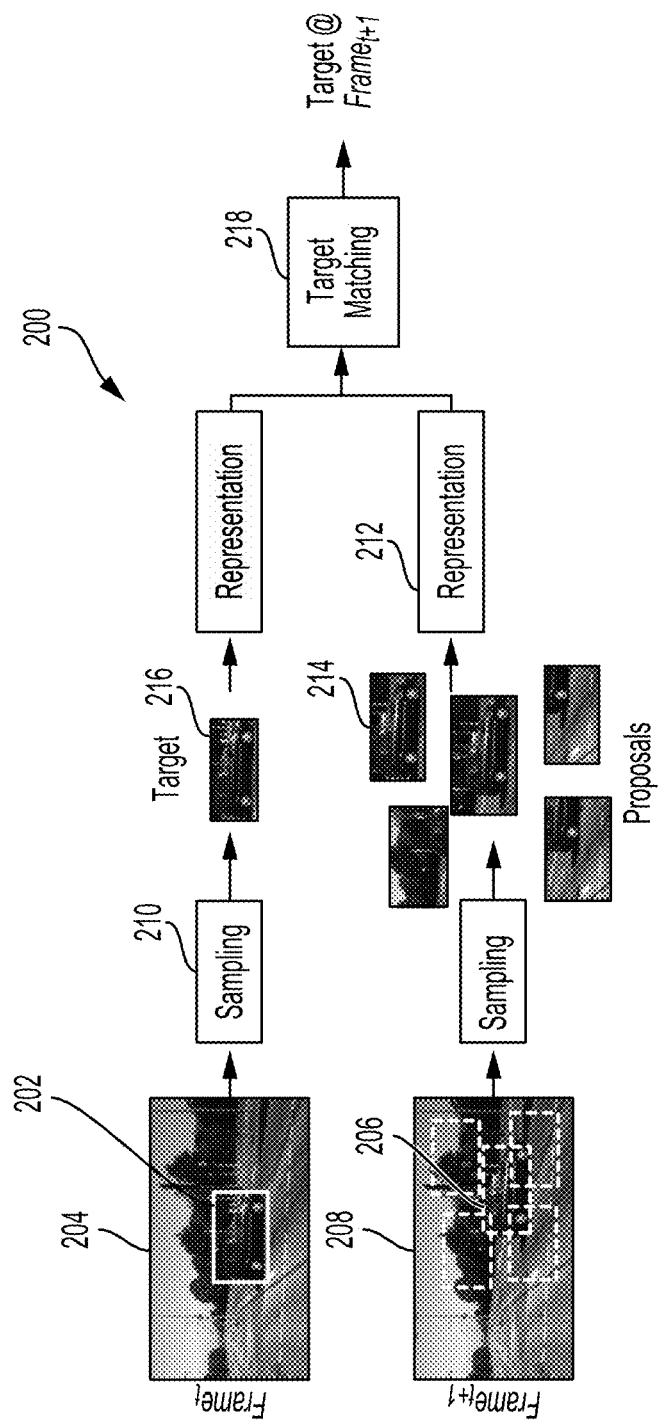
FIG. 2 illustrates an example of an object tracking neural network according to aspects of the present disclosure.

In one configuration, the artificial neural network is a convolutional neural network. The convolutional neural network may classify (e.g., discriminate) proposal regions as either a target or a background. FIG. 2 illustrates an example of an artificial neural network 200 trained to provide a vector indicating the coordinates of a target (e.g., target bounding box) in a subsequent frame (t+1) 208. That is, given a target 202 in a first frame (t) 204 and proposals 206 in the subsequent frame (t+1) 208, the artificial neural network 200 predicts a location of the target 202 in the subsequent frame (t+1) 208.

Based on the location of the target 202 from the current frame (t) 204, the artificial neural network 200 determines one or more proposals 206 (e.g., search regions) in the subsequent frame (t+1) 208. The proposals 206 may include a predicted location of the target 202 as well as areas adjacent to the predicted location. In the present example, the proposals 206 (e.g., search regions) are identified by bounding boxes. Furthermore, the target 202 in the current frame (t) 204 is identified by a bounding box.

As shown in FIG. 2, the target 202 from the current frame (t) 204 and the subsequent frame (t+1) 208 are input to a first set of layers 210 (e.g., sampling layers) of the artificial neural network 200. The first set of layers 210 generate an extracted (e.g., cropped) target 216 from the current frame (t) 204. The first set of layers 210 also extract proposal regions 214 from each proposal 206 of the subsequent frame (t+1) 208. The extracted target 216 and extracted proposal regions 214 are input to a second set of layers 212 (e.g., representation layers) to extract features from the extracted target 216 and to extract proposal regions 214. The extracted features may be represented as activations. The activations may also be referred to as a feature map. Furthermore, the activations may include a heat map.

The extracted features are output to a target matching layer 218 (e.g., fully connected layer, convolutional layer, or cross-correlation layer). The target matching layer 218 determines matching features from the extracted target 216 and the extracted proposal regions 214 to predict the coordinates of the target 202 within the subsequent frame (t+1) 208. The features from the extracted target 216 and the extracted proposal regions 214 may be matched using contrastive similarity loss, binary classification loss, regression loss, or other types of loss functions. The predicted location may be identified by a bounding box. The process continues for each frame of a series of consecutive frames. The artificial neural network used for object tracking may be referred to as an object tracker.

As previously discussed, the object tracker may fail due to various conditions, such as, for example, unstable lighting, erratic movement by a target, movement of a tracking camera, clutter in a frame, and/or occlusion of the target. Failure may cause the object tracker to search an incorrect region. The failure may be propagated over time such that if an object is lost at a frame t, the tracker may not find the object in a subsequent frame t+1, as well as a later frame t+n. That is, based on an initial tracking failure, the object tracker may lose track of the target. In conventional systems, a substantial period of time may pass between a failure time and a failure detection time.

Because a substantial period of time may elapse before an object tracker recovers from the initial tracking failure, it is desirable to reduce an amount of time for determining a tracking failure. Aspects of the present disclosure are directed to detecting a tracking failure and initializing a recovery mode in response to the detected failure. The recovery mode may re-initialize the target and the search regions. Failure detection may also improve the fusion of multiple trackers. For example, when multiple trackers are used together, the failure detection may filter out predictions from failed trackers.

Figure 3:
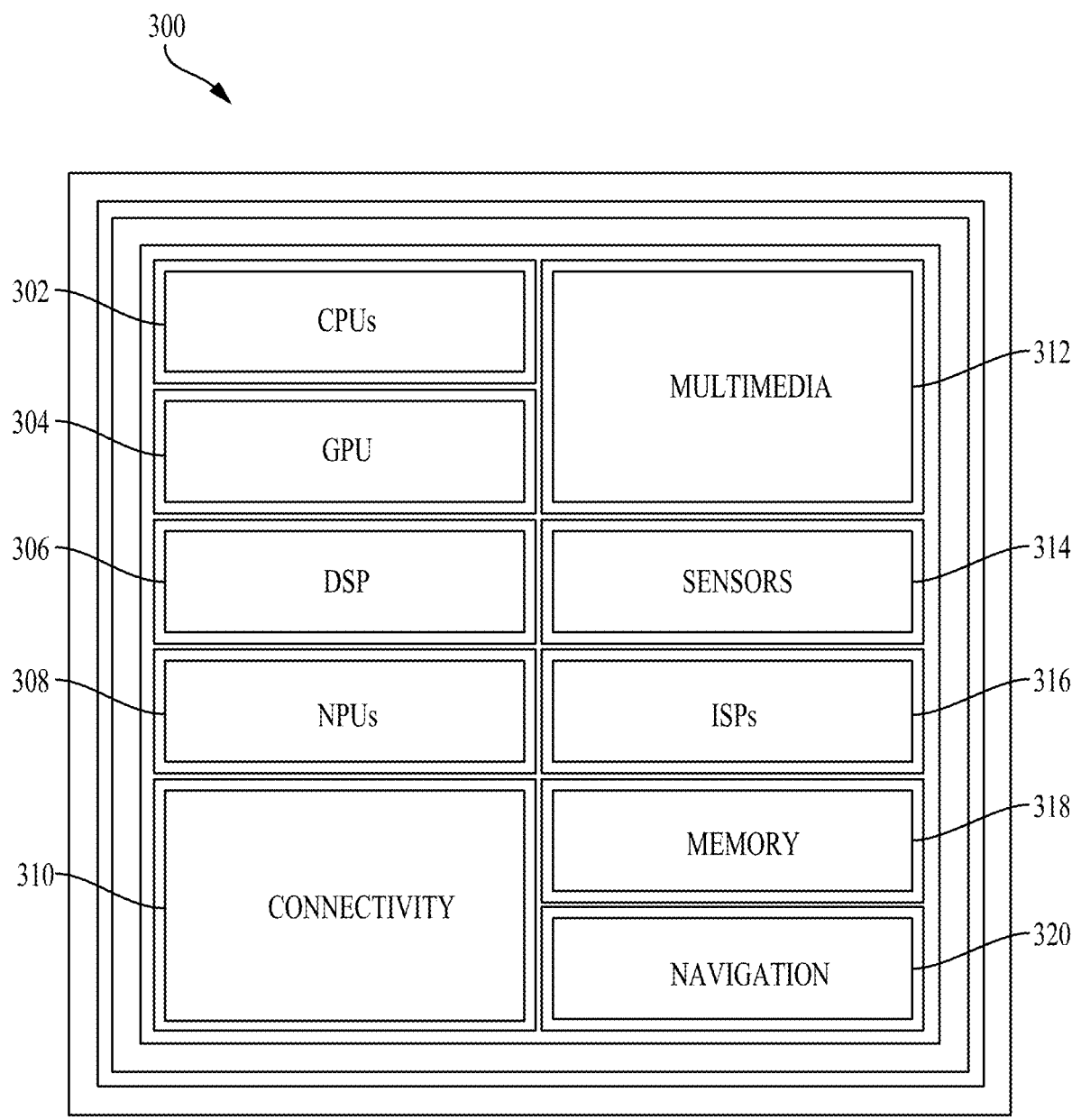
FIG. 3 illustrates an example implementation of designing a neural network using a system-on-a-chip (SOC), including a general-purpose processor in accordance with certain aspects of the present disclosure.

FIG. 3 illustrates an example implementation of the aforementioned method of detecting failure of an object tracking network using a system-on-a-chip (SOC) 300, which may include a general-purpose processor (CPU) or multi-core general-purpose processors (CPUs) 302 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a dedicated memory block 318, or may be distributed across multiple blocks. Instructions executed at the general-purpose processor 302 may be loaded from a program memory associated with the CPU 302 or may be loaded from a dedicated memory block 318.

The SOC 300 may also include additional processing blocks tailored to specific functions, such as a GPU 304, a DSP 306, a connectivity block 330, which may include fifth generation (5G) connectivity, fourth generation long term evolution (4G LTE) connectivity, unlicensed Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs), and/or navigation 320, which may include a global positioning system.

The SOC 300 may be based on an ARM instruction set. In an aspect of the present disclosure, the instructions loaded into the general-purpose processor 302 may comprise code to receive activations from an intermediate layer of the object tracking network. The instructions loaded into the general-purpose processor 302 may also comprise code to classify the activations as a failure or success. In addition, the instructions loaded into the general-purpose processor 302 may comprise code to determine whether to adjust a mode of the object tracking network based on the classification.

Figure 4:
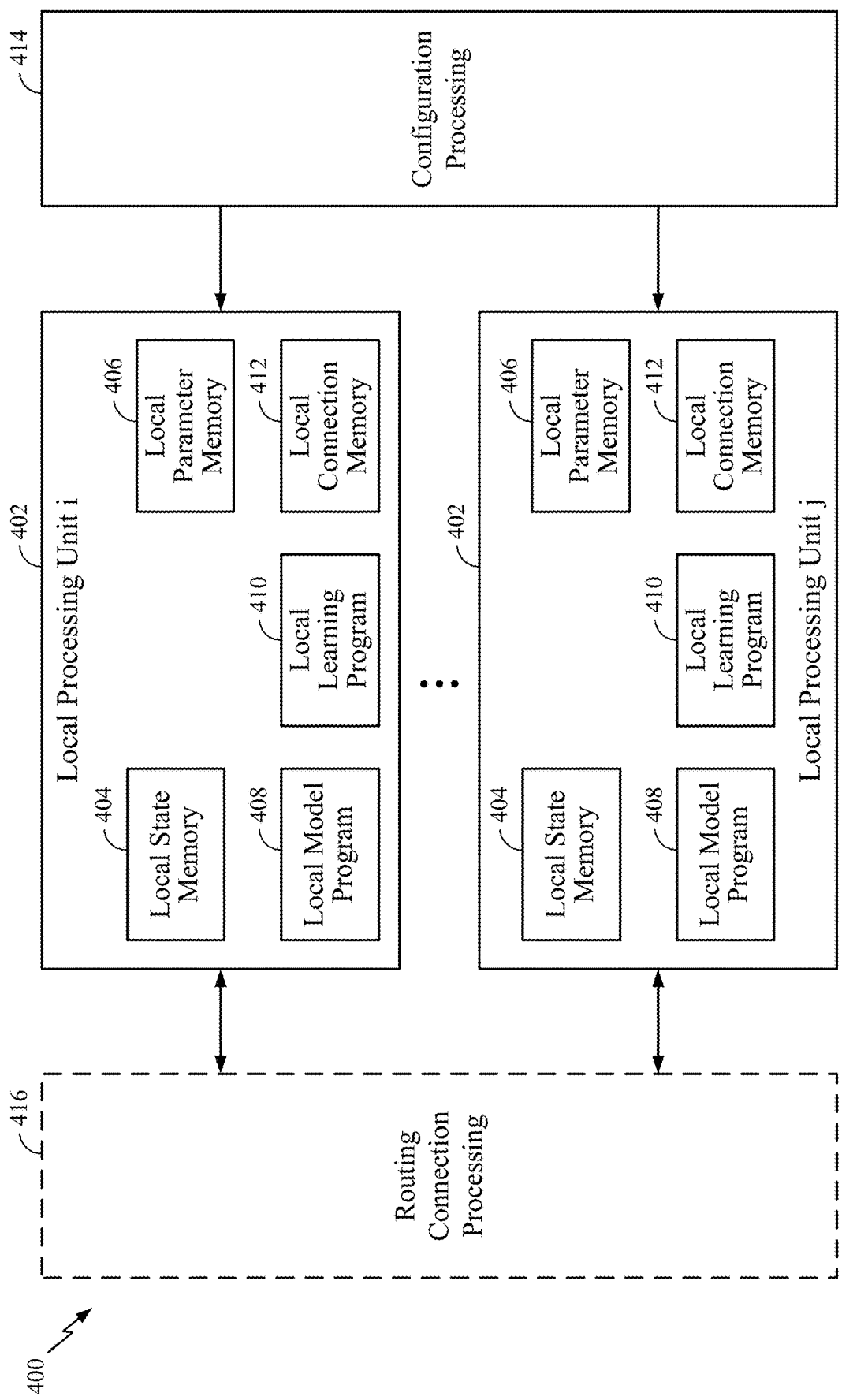
FIG. 4 illustrates an example implementation of a system in accordance with aspects of the present disclosure.

FIG. 4 illustrates an example implementation of a system 400 in accordance with certain aspects of the present disclosure. As illustrated in FIG. 4, the system 400 may have multiple local processing units 402 that may perform various operations of methods described herein. Each local processing unit 402 may comprise a local state memory 404 and a local parameter memory 406 that may store parameters of a neural network. In addition, the local processing unit 402 may have a local (neuron) model program (LMP) memory 408 for storing a local model program, a local learning program (LLP) memory 410 for storing a local learning program, and a local connection memory 412. Furthermore, as illustrated in FIG. 4, each local processing unit 402 may interface with a configuration processor unit 414 for providing configurations for local memories of the local processing unit, and with a routing connection processing unit 416 that provides routing between the local processing units 402.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training.

Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 5A:
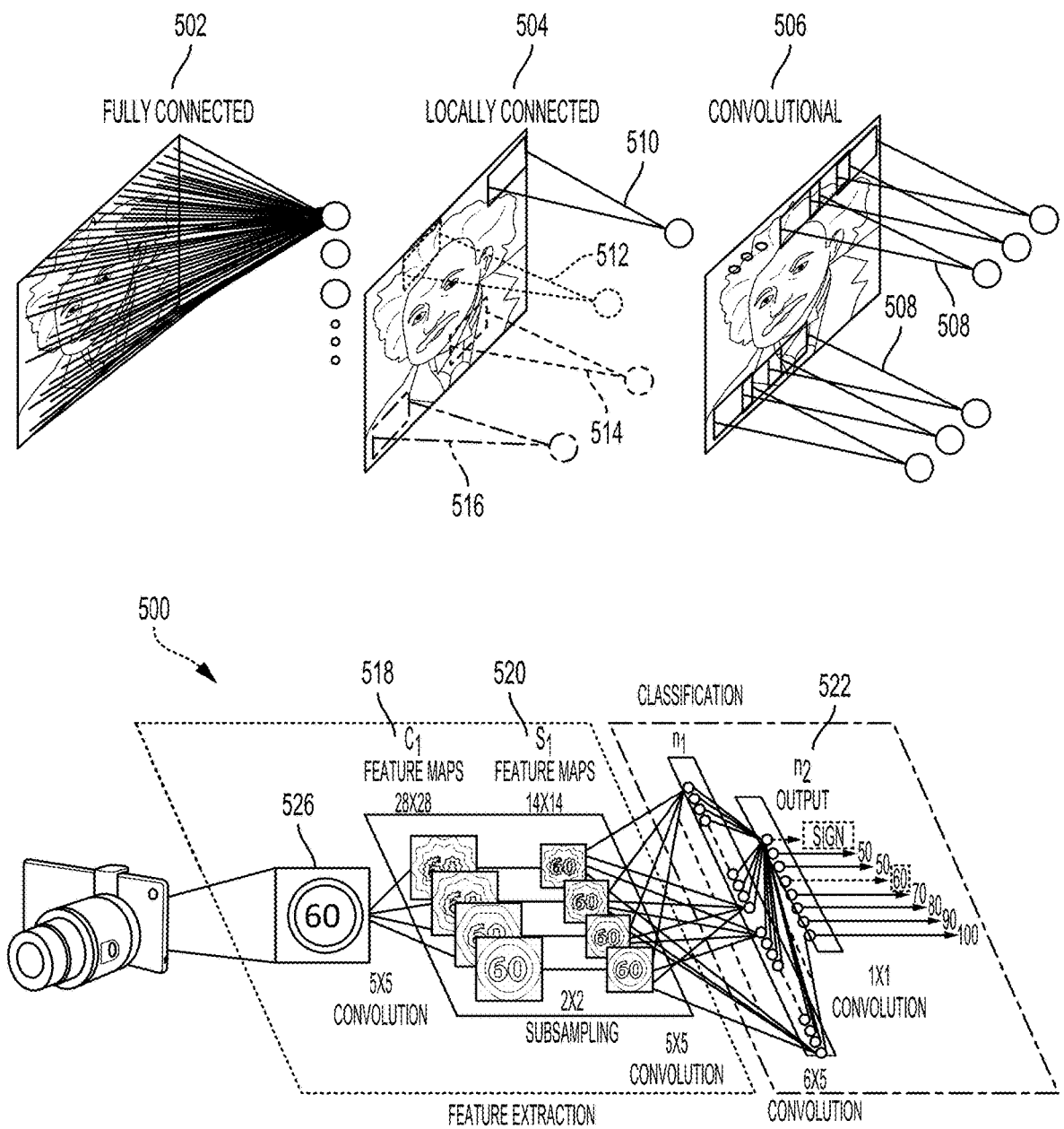
FIG. 5A is a diagram illustrating a neural network in accordance with aspects of the present disclosure.

Referring to FIG. 5A, the connections between layers of a neural network may be fully connected 502 or locally connected 504. In a fully connected network 502, a neuron in a first layer may communicate its output to every neuron in a second layer, so that each neuron in the second layer will receive input from every neuron in the first layer. Alternatively, in a locally connected network 504, a neuron in a first layer may be connected to a limited number of neurons in the second layer. A convolutional network 506 may be locally connected, and is further configured such that the connection strengths associated with the inputs for each neuron in the second layer are shared (e.g., 508). More generally, a locally connected layer of a network may be configured so that each neuron in a layer will have the same or a similar connectivity pattern, but with connections strengths that may have different values (e.g., 510, 512, 514, and 516). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 500 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A DCN may be trained with supervised learning. During training, a DCN may be presented with an image, such as a cropped image of a speed limit sign 526, and a "forward pass" may then be computed to produce an output 522. The output 522 may be a vector of values corresponding to features such as "sign," "60," and "100." The network designer may want the DCN to output a high score for some of the neurons in the output feature vector, for example the ones corresponding to "sign" and "60" as shown in the output 522 for a network 500 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 526 and a forward pass through the network may yield an output 522 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 518 and 520, with each element of the feature map (e.g., 520) receiving input from a range of neurons in the previous layer (e.g., 518) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5B:
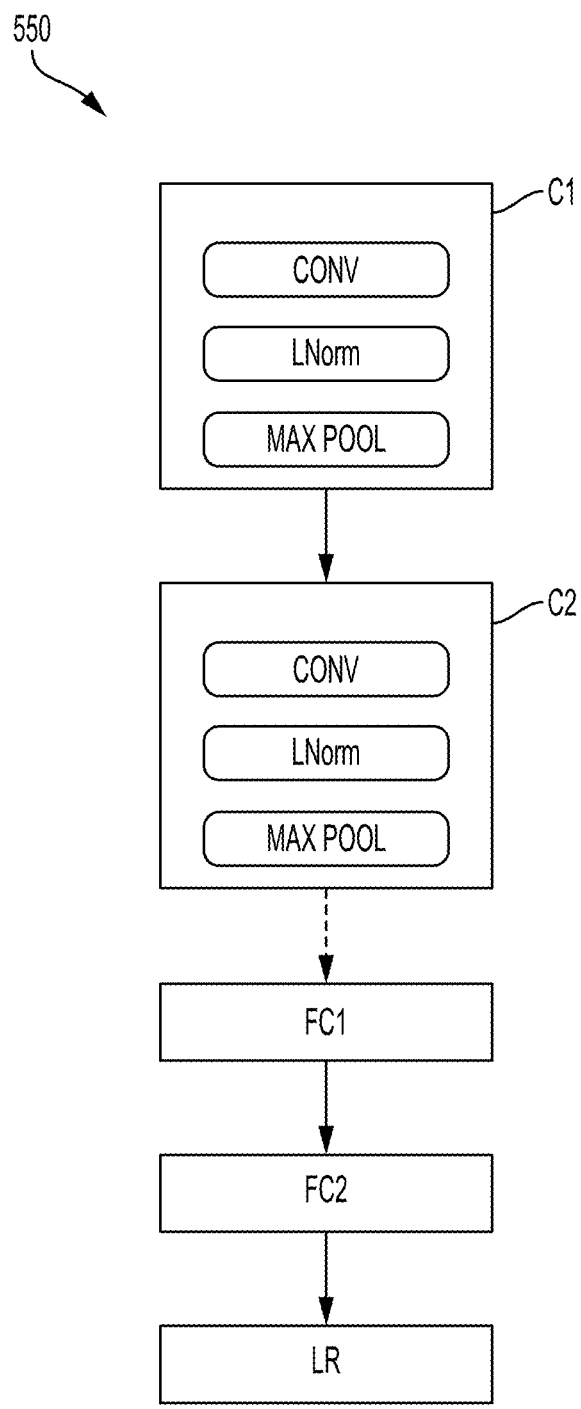
FIG. 5B is a block diagram illustrating an exemplary deep convolutional network (DCN) in accordance with aspects of the present disclosure.

FIG. 5B is a block diagram illustrating an exemplary deep convolutional network 550. The deep convolutional network 550 may include multiple different types of layers based on connectivity and weight sharing. As shown in FIG. 5B, the exemplary deep convolutional network 550 includes multiple convolution blocks 552, 554. Each of the convolution blocks 552, 554 may be configured with a convolution layer 556, a normalization layer (LNorm) 558, and a pooling layer 560. The convolution layers 556 may include one or more convolutional filters (not shown), which may be applied to the input data to generate a feature map. Although only two convolution blocks 552, 554 are shown, the present disclosure is not so limiting, and instead, any number of convolutional blocks may be included in the deep convolutional network 550 according to design preference. The normalization layer 558 may be used to normalize the output of the convolution filters. For example, the normalization layer 558 may provide whitening or lateral inhibition. The pooling layer 560 may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 550 may also include one or more fully connected layers 562, 564. The deep convolutional network 550 may further include a logistic regression (LR) layer 566. Between each layer of the deep convolutional network 550 are weights (not shown) that are to be updated. The output of each layer may serve as an input of a succeeding layer in the deep convolutional network 550 to learn hierarchical feature representations from input data (e.g., images, audio, video, sensor data and/or other input data) supplied at the first convolution block 552.

Figure 6:
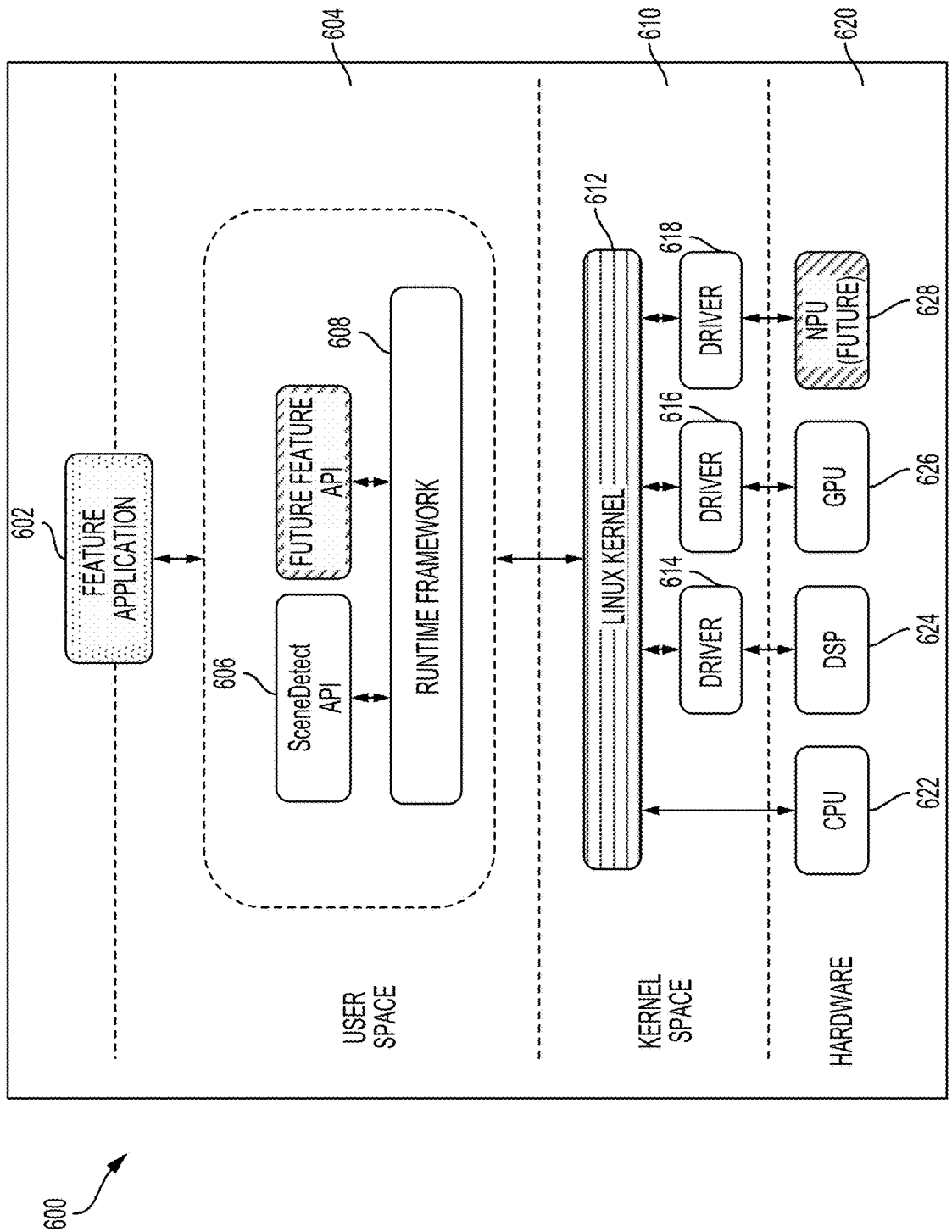
FIG. 6 is a block diagram illustrating an exemplary software architecture that may modularize artificial intelligence (AI) functions in accordance with aspects of the present disclosure.

FIG. 6 is a block diagram illustrating an exemplary software architecture 600 that may modularize artificial intelligence (AI) functions. Using the architecture, applications 602 may be designed that may cause various processing blocks of an SOC 620 (for example a CPU 622, a DSP 624, a GPU 626 and/or an NPU 628) to perform supporting computations during run-time operation of the application 602.

The AI application 602 may be configured to call functions defined in a user space 604 that may, for example, provide for the detection and recognition of a scene indicative of the location in which the device currently operates. The AI application 602 may, for example, configure a microphone and a camera differently depending on whether the recognized scene is an office, a lecture hall, a restaurant, or an outdoor setting such as a lake. The AI application 602 may make a request to compiled program code associated with a library defined in a SceneDetect application programming interface (API) 606 to provide an estimate of the current scene. This request may ultimately rely on the output of a deep neural network configured to provide scene estimates based on video and positioning data, for example.

A run-time engine 608, which may be compiled code of a Runtime Framework, may be further accessible to the AI application 602. The AI application 602 may cause the run-time engine, for example, to request a scene estimate at a particular time interval or triggered by an event detected by the user interface of the application. When caused to estimate the scene, the run-time engine may in turn send a signal to an operating system 610, such as a Linux Kernel 612, running on the SOC 620. The operating system 610, in turn, may cause a computation to be performed on the CPU 622, the DSP 624, the GPU 626, the NPU 628, or some combination thereof. The CPU 622 may be accessed directly by the operating system, and other processing blocks may be accessed through a driver, such as a driver 614-618 for a DSP 624, for a GPU 626, or for an NPU 628. In the exemplary example, the deep neural network may be configured to run on a combination of processing blocks, such as a CPU 622 and a GPU 626, or may be run on an NPU 628, if present.

Figure 7:
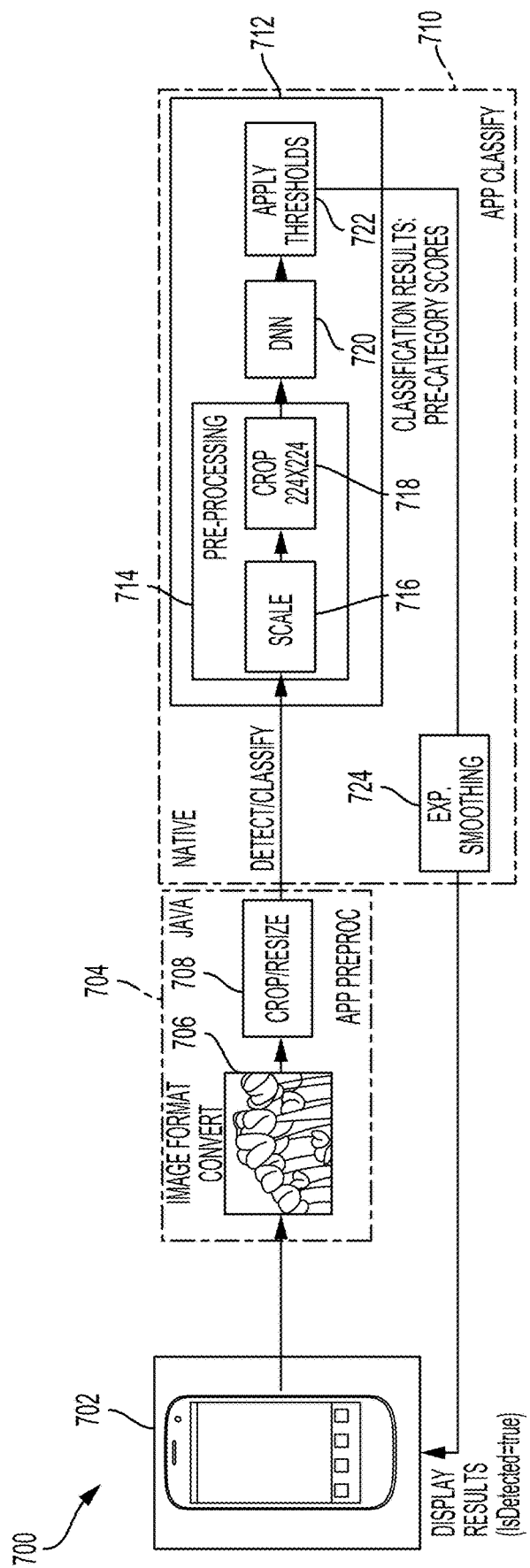
FIG. 7 is a block diagram illustrating the run-time operation of an AI application on a smartphone in accordance with aspects of the present disclosure.

FIG. 7 is a block diagram illustrating the run-time operation 700 of an AI application on a smartphone 702. The AI application may include a pre-process module 704 that may be configured (using for example, the JAVA programming language) to convert the format of an image 706 and then crop and/or resize the image 708. The pre-processed image may then be communicated to a classify application 710 that contains a SceneDetect Backend Engine 712 that may be configured (using for example, the C programming language) to detect and classify scenes based on visual input. The SceneDetect Backend Engine 712 may be configured to further preprocess 714 the image by scaling 716 and cropping 718. For example, the image may be scaled and cropped so that the resulting image is 224 pixels by 224 pixels. These dimensions may map to the input dimensions of a neural network. The neural network may be configured by a deep neural network block 720 to cause various processing blocks of the SOC 300 to further process the image pixels with a deep neural network. The results of the deep neural network may then be thresholded 722 and passed through an exponential smoothing block 724 in the classify application 710. The smoothed results may then cause a change of the settings and/or the display of the smartphone 702.

In one configuration, a machine learning model is configured for receiving an activation from an intermediate layer of the object tracking network. The model is also configured for classifying the activation as a failure or success. The model is further configured for determining whether to adjust a mode of the object tracking network based on the classification.

The model includes receiving means, classifying means, and/or determining means. In one aspect, the receiving means, classifying means, and/or determining means may be the general-purpose processor 302, program memory associated with the general-purpose processor 302, memory block 318, local processing units 402, and or the routing connection processing units 416 configured to perform the functions recited. In another configuration, the aforementioned means may be any module or any apparatus configured to perform the functions recited by the aforementioned means.

According to certain aspects of the present disclosure, each local processing unit 402 may be configured to determine parameters of the model based upon desired one or more functional features of the model, and develop the one or more functional features towards the desired functional features as the determined parameters are further adapted, tuned and updated.

As previously discussed, an object tracking system may implement an artificial neural network, such as a convolutional neural network, to track an object. In one configuration, the activations of the artificial neural network are used to determine whether the object tracker has failed. That is, activations of a properly functioning object tracker are different from activations of a failed object tracker. In this configuration, activations are classified by a failure detection network. The failure detection network may be trained to detect a failure from network activations.

Figure 8:
FIG. 8 illustrates an example of activations generated from an object tracking neural network in accordance with aspects of the present disclosure.

FIG. 8 illustrates examples of activations (e.g., feature maps) of a tracked object and a lost object. In this example, feature maps are generated from a cross-correlation layer. The cross-correlation layer convolves activations from a target representation (e.g., filters) into activations from a proposal representations (e.g., input). As shown in FIG. 8, feature maps 802 of a tracked target are different from feature maps 804 of a lost target. In this example, the feature maps 802 of the tracked target may be more centered and less scattered in comparison to the feature maps 804 of the lost target. The lost target refers to a target that is not properly tracked due to a failure of the object tracker.

Figure 9:
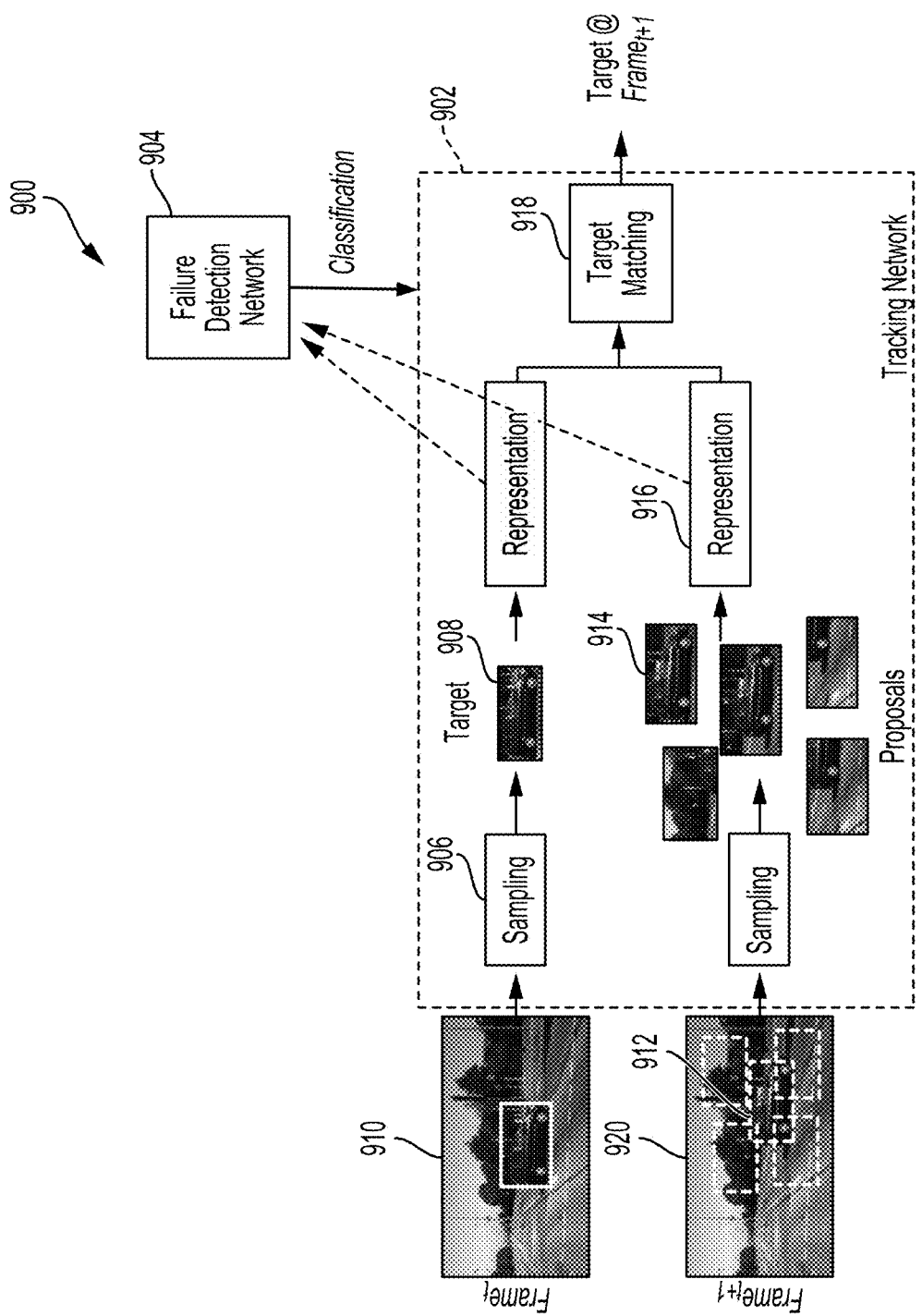
FIG. 9 illustrates an example of an object tracking neural network and a failure detection network in accordance with aspects of the present disclosure.

Aspects of the present disclosure are directed to training a second network to classify a tracker as failed (e.g., lost target) or successful (e.g., tracked target). The second network (e.g., failure detection network) may receive activations from any layer of an object tracking network (e.g., first network). FIG. 9 illustrates an example of an artificial neural network 900 that includes an object tracking network 902 and a failure detection network 904 according to aspects of the present disclosure.

The failure detection network 904 may be a trained binary classifier. In this configuration, based on the received feature maps, the failure detection network 904 determines whether tracking has failed. That is, the failure detection network 904 may classify the tracking as failed or successful. In one configuration, the failure detection network 904 is a convolutional neural network, such as a shallow convolutional neural network. In another embodiment, the failure detection network 904 is a recurrent convolutional neural network.

As shown in FIG. 9, a first set of layers 906 (e.g., sampling layers) generates an extracted (e.g., cropped) target 908 from the current frame (t) 910. The first set of layers 906 also extract proposal regions 914 from each proposed search region 912 of a subsequent frame (t+1) 920. The extracted target 908 and extracted proposal regions 914 are input to a second set of layers 916 (e.g., representation layers) to extract features from the extracted target 908 and the extracted proposal regions 914. That is, the second set of layers 916 generates feature maps based on the extracted target 908 and extracted proposal regions 914.

In one configuration, the feature maps (e.g., activations) are output to the failure detection network 904. The feature maps and activations may also be referred to as intermediary representations. Furthermore, the feature maps and activations may include activity maps (e.g., heat maps), or other types of maps. That is, the activity maps may be any type of activation from an intermediate layer of the object tracking network 902.

In the example of FIG. 9, the failure detection network 904 receives the feature maps from the second set of layers 916. As discussed above, aspects of the present disclosure are not limited to receiving feature maps from the second set of layers 916. The failure detection network 904 may receive activations from any layer. Furthermore, in addition to receiving activations, the failure detection network 904 may also receive contextual information, such as raw pixels of a frame and/or an optical flow. The contextual information may improve the failure detection.

In one configuration, in response to receiving the activations, the failure detection network may classify the tracker as failed or successful. As shown in FIG. 9, the failure detection network 904 may output the classification to the object tracking network 902. If the failure detection network 904 classifies the tracker as failed, the object tracking network 902 initiates a recovery mode of the object tracking network 902. Additionally, or alternatively, based on the classification, the failure detection network 904 may initiate a recovery mode of the object tracking network 902.

The recovery mode re-initializes the tracker by setting a new target object. The coordinates of the new target object may be requested from user or may be obtained from an object detector. Additionally, the recovery mode may refine the search region (e.g., a location where the tracker is searching for the object) based on the new location of the target. For example, the recovery mode may expand the search region around the target location. Furthermore, in response to the failure detection network 904 determining that the object tracking network 902 has not failed, the object tracking network 902 may remain in a tracking mode.

Additionally, as shown in FIG. 9, extracted features are output to a target matching layer 918 (e.g., fully connected layer or cross-correlation layer). The target matching layer 918 determines matching features from the extracted target 908 and proposal regions 914 to predict the coordinates of the target within the subsequent frame (t+1) 920. The predicted matching for the extracted target 908 and the extracted proposal regions 914 may be evaluated using contrastive similarity loss, binary classification loss, regression loss, or other types of loss functions. The location may be indicated by a bounding box. The process continues for each frame of a series of consecutive frames.

The artificial neural network used for object tracking can be referred to as an object tracker. Additionally, aspects of the present disclosure are not limited to a Siamese tracking network and contemplate any type of tracking network. For example, the object tracking network 902 may have one branch for the representation layer 916, such that the failure detection network 904 receives activations from only one branch.

As previously discussed, a failure detection network may be trained to classify an object tracker as failed (e.g., not tracking) or successful (e.g., tracking) based on feature maps generated at an object tracking network. In one configuration, the failure detection network is trained with a trained object tracking network and also training videos with object bounding boxes. The object tracking network may be trained by any training technique. In one configuration, the trained object tracking network receives the training videos as an input.

In response to receiving the training videos, the trained object tracker may begin tracking objects in the training videos. During the course of the object tracking, hidden layers of the trained object tracking network may generate feature maps based on the training videos. For example, cross-correlation layers of the trained object tracking network may generate responses for a fully convolutional Siamese network. Furthermore, when training the failure detection network, an object location predicted by the trained object tracking may be compared to a ground-truth object location. In one configuration, failure labels are extracted based on an overlap between the predicted object location and the ground-truth object location. The overlap may be measured as the intersection over union between two bounding boxes. The failure labels may be correlated with the feature maps to train the failure detection network as a binary classifier for classifying a failed tracker. Additionally, or alternatively, the failure detection network may be trained based on a regression loss that predicts the overlap value between the tracked bounding box and the ground-truth bounding box.

Aspects of the present disclosure are not limited to training the failure detection network after the object tracking network has been trained. The failure detection network may be trained jointly or independently from the object tracking network. In one configuration, the same training data (e.g., training videos) is used to train (independently or jointly) the object tracking network and the failure detection network. In another configuration, the prevent coadoption by both the object tracking network and the failure detection network, different training data is used when training (independently or jointly) the object tracking network and the failure detection network.

As previously discussed, the failure detection network may be a recurrent convolutional neural network. In this configuration, the failure detection network is trained using training data with a temporal dependency length (e.g., ms or seconds) that is determined based on a use case. The use case may correspond to an expected amount of occlusion in a sensor's environment. For example, if the sensor (e.g., camera on a car) is expected to be on a freeway (e.g., highly dynamic environment) where objects are occluded for a short period of time, training data with short temporal dependencies may be used for training. In another example, if the sensor is expected to be on a city street where objects may be occluded for a long period of time, training data with long temporal dependencies may be used for training. The temporal dependency refers to the temporal relationship of an object over a series of frames, which correspond to the sequence lengths used for training.

In most cases, feature maps are two-dimensional (2D) tensors. Therefore, in one configuration, the failure detection network is a convolutional neural network that is capable of capturing spatial information of the feature maps. FIG. 10 illustrates an example of a failure detection network 1000 according to aspects of the present disclosure. As shown in FIG. 10, a convolution layer 1002 receives feature maps from one or more layers, such as cross-correlation layers, of an object tracking network. The convolution layer 1002 convolves the feature maps with filters and transmits the convolved feature maps to a first sigmoid layer 1004. In one configuration, the convolution layer 1002 uses a 3×3 convolution filter. The first sigmoid layer 1004 introduces non-linearity to the failure detection network 1000, which is used to learn decision boundaries (e.g., failure vs. non-failure). Other non-linearities may be used, such as a rectified linear unit (ReLU) or a hyperbolic tangent (tan h). That is, an output of the convolution layer 1002 (e.g., the product of an input and weights) may be represented as a linear combination of the input (e.g., sequence of feature maps) based on an output of the first sigmoid layer 1004.

The first sigmoid layer 1004 outputs to a global max pooling layer 1006. The global max pooling layer 1006 aggregates the feature maps into one dimensional vectors. The one dimensional vectors may be the desired input to the fully connected layer 1010 (e.g., target matching layer). Furthermore, the global max pooling layer 1006 outputs to a second sigmoid layer 1008. The second sigmoid layer 1008 outputs to a fully connected layer 1010. In this configuration, because the failure detection network 1000 is a binary classifier, the fully connected layer 1010 generates a two-dimensional vector. A first dimension of the vector corresponds to a probability of a tracker failure and a second dimension of the vector corresponds to a probability of a tracker success. The two-dimensional vector may be output to a third sigmoid layer 1012 and then a cross-entropy loss layer 1014. The cross-entropy loss layer 1014 outputs the probability of a target loss. The cross-entropy loss layer 1014 compares the prediction from the fully connected layer 1010 with the ground-truth. The cross-entropy loss layer 1014 may be replaced by other classifications or regression losses.

In another configuration, the failure detection network is a recurrent neural network, such as a recurrent convolutional neural network, a long short term memory (LSTM) network, or a gated recurrent unit (GRU) network. FIG. 11 illustrates an example of a failure detection network 1100 according to aspects of the present disclosure. As shown in FIG. 11, a convolution layer 1102 receives feature maps from one or more layers, such as cross-correlation layers, of an object tracking network. The convolution layer 1102 convolves the feature maps with filters and transmits the convolved feature maps to a first sigmoid layer 1104. The first sigmoid layer 1104 introduces non-linearity to the failure detection network 1100. That is, an output of the convolution layer 1102 (e.g., the product of an input and weights) may be represented as a linear combination of the input (e.g., sequence of feature maps) based on an output of the first sigmoid layer 1104.

The first sigmoid layer 1104 outputs to a global max pooling layer 1106. Furthermore, the global max pooling layer 1106 outputs to a second sigmoid layer 1108. The second sigmoid layer 1108 outputs to a recurrent layer 1110. The recurrent layer 1110 may model temporal dependencies of the activations. That is, by modeling the temporal dependencies of the activations, the failure detection network 1100 may detect a failure over time (e.g., a series of frames) rather than detecting a failure at an individual frame. For example, based on an environment of a sensor (e.g., car driving on a highway, car driving at night, or car driving on an open road), a number of frames (e.g., temporal length) may be set for detecting a failure. In this example, the failure is detected if the activations indicate a failure over the set number of frames.

Additionally, the recurrent layer 1110 outputs to a fully connected layer 1115. In this configuration, because the failure detection network 1100 is a binary classifier, the fully connected layer 1115 generates a vector. A first element of the vector corresponds to a probability of a tracker failure and a second element of the vector corresponds to a probability of a tracker success. The predicted vector may be output to a third sigmoid layer 1112 and then a cross-entropy loss layer 1114. The cross-entropy loss layer 1114 outputs the probability of a target loss.

Figure 12:
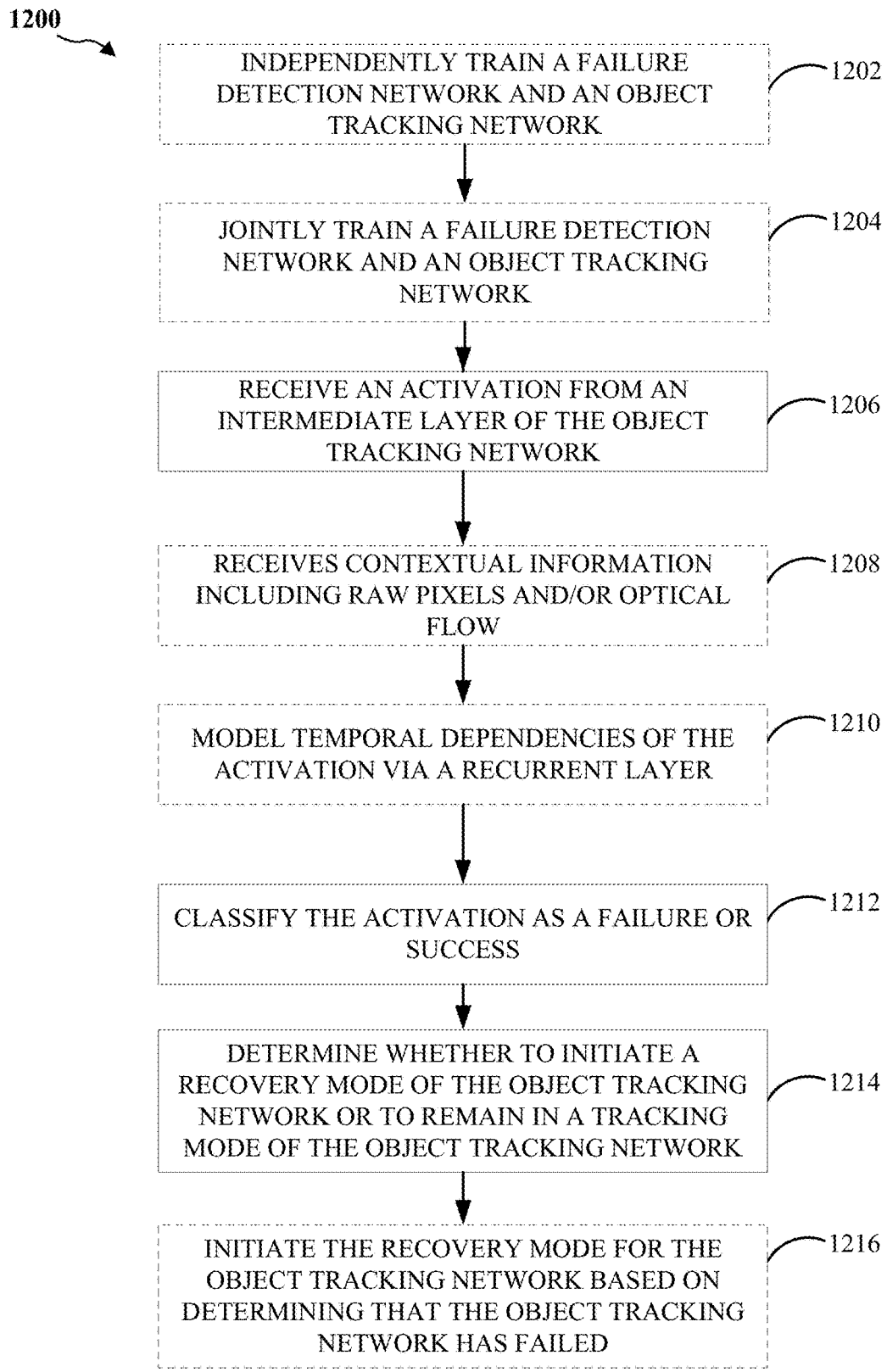
FIG. 12 illustrates a method for detecting failure of an object tracking network with a failure detection network in accordance with aspects of the present disclosure.

FIG. 12 illustrates a method 1200 for detecting failure of an object tracking network with a failure detection network in accordance with aspects of the present disclosure. In an optional configuration, at block 1202, a failure detection network and an object tracking network are independently trained. Alternatively, or additionally, in an optional configuration, at block 1204, the failure detection network and an object tracking network are jointly trained. That is, the failure detection network may be trained to classify an object tracker as failed (e.g., not tracking) or successful (e.g., tracking) based on feature maps generated at an object tracking network.

At block 1206, the failure detection network receives an activation from an intermediate layer of the object tracking network. As an example, as shown in FIG. 9, the failure detection network may receive activations from a representation layer. The activation includes a similarity map and/or an output from an intermediate layer. In an optional configuration, at block 1208, the failure detection network receives contextual information including raw pixels and/or optical flow.

The failure detection network may be a convolutional neural network or a recurrent convolutional neural network. The convolutional neural network may be a shallow convolutional neural network. In an optional configuration, at block 1210, the failure detection models temporal dependencies of the activation via a recurrent layer. The recurrent layer includes a long short term memory network or a gated recurrent unit network. The temporal dependency refers to the temporal relationship of an object over a series of frames, which correspond to the sequence lengths used for training. The use case may correspond to an expected amount of occlusion in a sensor's environment. For example, if the sensor (e.g., camera on a car) is expected to be on a freeway (e.g., highly dynamic environment) where objects are occluded for a short period of time, training data with short temporal dependencies may be used for training.

At block 1212, the failure detection network classifies the activation as a failure or success. The classification may be based on the received activation. Alternatively, the classification may be based on the received activation and also the received contextual information. At block 1214, the failure detection network determines whether to initiate a recovery mode of the object tracking network or to remain in a tracking mode of the object tracking network. The determination may be based on the classification of the failure or success. In an optional configuration, at block 1216, the failure detection network initiates the recovery mode for the object tracking network based on determining that the object tracking network has failed. The recovery mode includes resetting the object tracking network, switching to an object detector, refining a search region, or requesting user input.

In some aspects, the method 1200 may be performed by the SOC 300 (FIG. 3) or the system 400 (FIG. 4). That is, each of the elements of method 1200 may, for example, but without limitation, be performed by the SOC 300 or the system 400 or one or more processors (e.g., CPU 302 and local processing unit 402) and/or other components included therein.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of detecting failure of an object tracking network with a failure detection network, comprising:
    receiving, at the failure detection network, an activation from an intermediate layer of the object tracking network, the failure detection network and the object tracking network being different networks;
    classifying, at the failure detection network, the activation as a failure or success; and
    determining, at the failure detection network, whether to initiate a recovery mode of the object tracking network or to remain in a tracking mode of the object tracking network, based on the classifying.

2. The method of claim 1, further comprising initiating the recovery mode for the object tracking network based on determining that the object tracking network has failed.

3. The method of claim 2, in which the recovery mode comprises resetting the object tracking network, switching to an object detector, refining a search region, or requesting user input.

4. The method of claim 1, in which the failure detection network is a convolutional neural network or a recurrent convolutional neural network.

5. The method of claim 4, in which the convolutional neural network comprises a shallow convolutional neural network.

6. The method of claim 4, further comprising modelling temporal dependencies of the activation via a recurrent layer, the recurrent layer comprising a long short term memory network or a gated recurrent unit network.

7. The method of claim 1, in which the activation comprises at least one of a similarity map, an output from an intermediate layer, or a combination thereof.

8. The method of claim 1, further comprising receiving, at the failure detection network, contextual information comprising at least one of raw pixels, optical flow, or a combination thereof.

9. The method of claim 1, further comprising training the failure detection network and the object tracking network independently.

10. The method of claim 1, further comprising training the failure detection network and the object tracking network jointly.

11. A failure detection network for detecting failure of an object tracking network, the failure detection network comprising:
    a memory; and
    at least one processor coupled to the memory, the at least one processor configured:
        to receive an activation from an intermediate layer of the object tracking network, the failure detection network and the object tracking network being different networks;
        to classify the activation as a failure or success; and
        to determine whether to initiate a recovery mode of the object tracking network or to remain in a tracking mode of the object tracking network, based on the classifying.

12. The failure detection network of claim 11, in which the at least one processor is further configured to initiate the recovery mode for the object tracking network based on determining that the object tracking network has failed.

13. The failure detection network of claim 12, in which the recovery mode comprises resetting the object tracking network, switching to an object detector, refining a search region, or requesting user input.

14. The failure detection network of claim 11, in which the failure detection network is a convolutional neural network or a recurrent convolutional neural network.

15. The failure detection network of claim 14, in which the convolutional neural network comprises a shallow convolutional neural network.

16. The failure detection network of claim 14, in which the at least one processor is further configured to model temporal dependencies of the activation via a recurrent layer, the recurrent layer comprising a long short term memory network or a gated recurrent unit network.

17. The failure detection network of claim 11, in which the activation comprises at least one of a similarity map, an output from an intermediate layer, or a combination thereof.

18. The failure detection network of claim 11, in which the at least one processor is further configured to receive contextual information comprising at least one of raw pixels, optical flow, or a combination thereof.

19. The failure detection network of claim 11, in which the at least one processor is further configured to train the failure detection network and the object tracking network independently.

20. The failure detection network of claim 11, in which the at least one processor is further configured to train the failure detection network and the object tracking network jointly.

21. A non-transitory computer-readable medium having program code recorded thereon for detecting failure of an object tracking network with a failure detection network, the program code executed by a processor and comprising:
- program code to receive an activation from an intermediate layer of the object tracking network, the failure detection network and the object tracking network being different networks;
- program code to classify the activation as a failure or success; and
- program code to determine whether to initiate a recovery mode of the object tracking network or to remain in a tracking mode of the object tracking network, based on the classifying.

22. The non-transitory computer-readable medium of claim 21, in which the program code further comprises program code to initiate the recovery mode for the object tracking network based on determining that the object tracking network has failed.

23. The non-transitory computer-readable medium of claim 22, in which the recovery mode comprises resetting the object tracking network, switching to an object detector, refining a search region, or requesting user input.

24. The non-transitory computer-readable medium of claim 23, in which the failure detection network is a convolutional neural network or a recurrent convolutional neural network.

25. The non-transitory computer-readable medium of claim 24, in which the convolutional neural network comprises a shallow convolutional neural network.

26. An apparatus for detecting failure of an object tracking network, comprising:
- means for receiving an activation from an intermediate layer of the object tracking network, the failure detection network and the object tracking network being different networks;
- means for classifying the activation as a failure or success; and
- means for determining whether to initiate a recovery mode of the object tracking network or to remain in a tracking mode of the object tracking network, based on the classifying.

27. The apparatus of claim 26, further comprising means for initiating the recovery mode for the object tracking network based on determining that the object tracking network has failed.

28. The apparatus of claim 27, in which the recovery mode comprises resetting the object tracking network, switching to an object detector, refining a search region, or requesting user input.

29. The apparatus of claim 26, further comprising means for receiving contextual information comprising at least one of raw pixels, optical flow, or a combination thereof.

30. The apparatus of claim 26, in which the activation comprises at least one of a similarity map, an output from an intermediate layer, or a combination thereof.

* * * * *